(12) United States Patent
Hayakawa (10) Patent No.: US 7,384,700 B2
(45) Date of Patent: Jun. 10, 2008

(54) LEADER TAPE AND MAGNETIC TAPE CARTRIDGE USING THE SAME

(75) Inventor: Satoru Hayakawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 498 days.

(21) Appl. No.: 11/091,401

(22) Filed: Mar. 29, 2005

(65) Prior Publication Data

US 2005/0214595 A1 Sep. 29, 2005

(30) Foreign Application Priority Data

Mar. 29, 2004 (JP) ............ P.2004-094386
Mar. 28, 2005 (JP) ............ P.2005-092579

(51) Int. Cl.
G11B 5/708 (2006.01)
G11B 5/66 (2006.01)
G11B 15/60 (2006.01)

(52) U.S. Cl. ................ 428/839.6; 428/842; 428/845.5; 360/134

(58) Field of Classification Search ................ 428/141, 428/832, 840.6, 839.6, 842, 845.7, 845.5; 360/134; 427/130, 131
See application file for complete search history.

(56) References Cited

U.S. PATENT DOCUMENTS

| 5,340,635 | A | * | 8/1994 | Isobe et al. ................ 428/842 |
| 6,033,760 | A | * | 3/2000 | Wakana et al. .......... 428/840.6 |
| 6,103,340 | A | * | 8/2000 | Kubo et al. ................ 428/141 |
| 2002/0045068 | A1 | * | 4/2002 | Tojo et al. ................ 428/842 |
| 2002/0086183 | A1 | * | 7/2002 | Misawa ................ 428/842 |
| 2003/0117747 | A1 | * | 6/2003 | Kunikata et al. .......... 360/134 |

FOREIGN PATENT DOCUMENTS

JP 2001-110164 A 4/2001

* cited by examiner

Primary Examiner—Carol Chaney
Assistant Examiner—Louis Falasco
(74) Attorney, Agent, or Firm—Sughrue Mion, PLLC (57) ABSTRACT

A leader tape comprising a support and a coating layer containing powder and a binder, wherein at least one surface of the leader tape has a center line average surface roughness (Ra) of from 10 to 60 nm, and depression hardness (DH) defined by the following equation (1) of from 60 to 140 $kg/mm^2$ (0.588 to 1.372 GPa):

$$DH = 3.7926 \times 10^{-2} [Pmax/(Hmax)^2] (kg/mm^2) \quad (1)$$

wherein Pmax is a maximum load and Hmax is a maximum displacement amount of an indenter.

12 Claims, 5 Drawing Sheets

TOP VIEW

FIG. 6

LEADER TAPE AND MAGNETIC TAPE CARTRIDGE USING THE SAME

FIELD OF THE INVENTION

The present invention relates to a leader tape and a magnetic tape cartridge comprising a cartridge case rotatably housing a reel on which a magnetic tape joined with the leader tape is wound.

BACKGROUND OF THE INVENTION

As magnetic tape cartridges so far used as recording media for external memory unit of, e.g., computers, a magnetic tape cartridge of the type comprising a cartridge case rotatably housing one or a plurality of reels on which a magnetic tape is wound is known. Since these magnetic tapes are used for the storage of computer data and important data are stored, these magnetic tape cartridges are constituted so that a trouble such as tape jamming does not occur and magnetic tapes are not taken out carelessly.

In a single reel type cartridge, a magnetic tape drive is constituted such that leader components such as a leader pin and a leader block for loading a magnetic tape are fixed at the tip of the magnetic tape, or a leader tape of a relatively hard plastic material having a hole for hitching punched at the tip thereof is joined onto the tip of the magnetic tape, and loading/unloading of the magnetic tape are done by holding and loading the leader components or the tip of the leader tape by the holding component of a recording/reproducing apparatus.

When loading/unloading of a magnetic tape are done by drawing the tip of the magnetic tape to the side of a magnetic recording/reproducing apparatus and winding the tip of the tape on a drive reel in the apparatus, it is preferred to reinforce the tape, since the tape is susceptible to damage if the tip of the tape is brought into contact with a tape guide and a magnetic head arranged in the traveling route in the state of not correctly being positioned and pulled.

It is also preferred to do reinforcement for the purpose of preventing the difference in levels of leader block generated on a drive reel from imprinting on a data-recording magnetic tape to thereby increase dropout, and splicing of a leader tape stronger than a magnetic tape on the tip of the magnetic tape is performed to cope with this phenomenon (refer to JP-A-2001-110164 (The term "JP-A" as used herein refers to an "unexamined published Japanese patent application".)).

When a magnetic tape cartridge is mounted on an LTO drive and load/unload are repeated, the surface of the leader tape that is rubbed with the running system of the LTO drive is scratched and the shavings adhere to the running system. The adhered shavings are transferred to the magnetic tape surface to cause the problem of the increase of dropout. In addition, the leader tape is deformed and the deformation is imprinted on the magnetic tape, which causes the deterioration of error rate.

The leader block is to be installed in the concavity of the core of a winding reel and a part of the leader block forms a part of the arc of the core in that state.

Figure 4A:
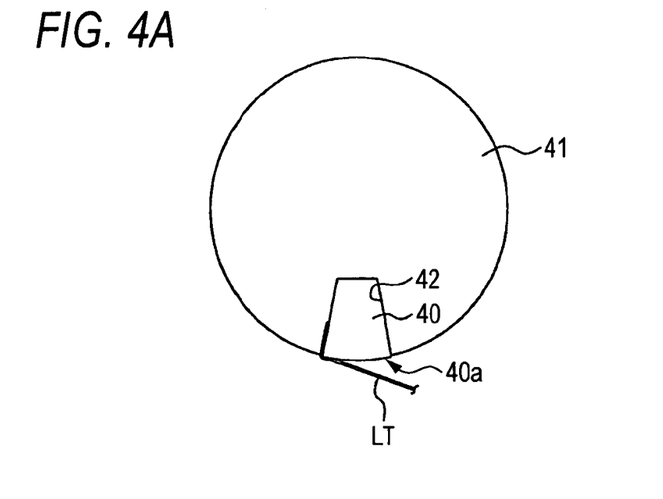
FIGS. 4A, 4B and 4C are views showing the prior art.

Explaining the structure typically, as shown in FIG. 4A, leader block 40 is invaginated in concavity 42 provided along the diameter direction of core 41, and end face 40a of leader block 40 constitutes a part of winding surface of core 41 in this state. End face 40a of leader block 40 forms arc for smoothly winding a magnetic tape MT corresponding to the peripheral surface of core 41 as shown in FIG. 4A.

Figure 4B:
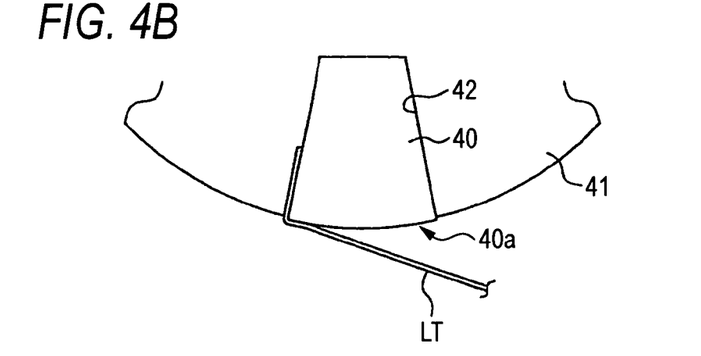

However, in these conventional tape drives, depending upon the dimensional accuracy of leader block 40 constituting a part of the winding surface, as shown in FIG. 4B, end face 40a protrudes from core 41 and an unallowable difference in levels is formed on the winding surface of core 41 in some cases.

Figure 4C:
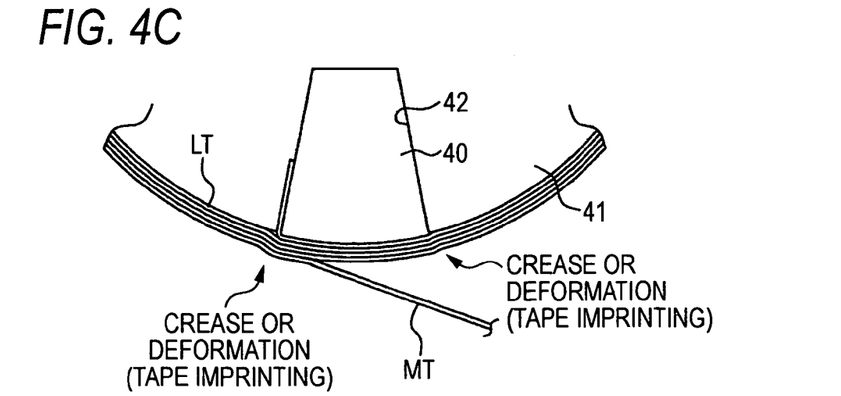

Such a difference in levels causes a crease and deformation on leader tape LT and, as shown in FIG. 4C, these crease (fold) and deformation are also formed on the same parts of magnetic tape MT, which are substantially recording areas, wound in the next layer on (so-called tape imprinting is generated). The tape imprinting is liable to cause such disadvantages that the proper distance between the tape and the recording/reproducing heads cannot be maintained during the process of recording and reproducing of data, which results in recording impossibility and the loss of data.

If a period of time when magnetic tape MT is wound on a winding reel is short, generation of the problem of imprinting is less, but when magnetic tape MT is used after being allowed to stand in the state of being wound on a reel, regular tape imprinting is sometimes formed on the surface of magnetic tape MT in almost equal pitch to the circumferential length of core 41.

SUMMARY OF THE INVENTION

The objects of the invention are to provide a leader tape that is hardly accompanied by dropout increase resulting from imprinting of the leader drive and leader block part due to long term storage and running under high temperature, and the surface of which is hardly susceptible to scratches, and to provide a magnetic tape cartridge using the leader tape.

The above objects of the invention can be solved by the following means.

1) A leader tape comprising a support having provided at least on one side a coating layer containing powder and a binder, wherein at least one side of the leader tape has center line average surface roughness (Ra) of from 10 to 60 nm, and depression hardness (DH) defined by the following equation (1) of from 60 to 140 kg/mm² (0.588 to 1.372 GPa):

$$DH = 3.7926 \times 10^{-2} [Pmax/(Hmax)^2] (kg/mm^2) \tag{1}$$

wherein Pmax is a maximum load and Hmax is a maximum displacement amount of an indenter, 2) A magnetic tape cartridge comprising a cartridge case rotatably housing one or a plurality of reels on which a magnetic tape is wound, wherein the leader tape as described in the above item 1) is joined at the tip of the magnetic tape for leading the magnetic tape to be loaded into a magnetic recording and reproducing apparatus.

In the leader tape according to the invention, by prescribing specific surface roughness, a proper gap is formed between tape and tape when the tape is wound, so that a leader block can be prevented from being imprinted on a magnetic tape by relaxing the pressure. Further, scratching on the surface of the leader tape and the increase of dropout can be prevented by the prescription of depression hardness (DH).

DESCRIPTION OF REFERENCE NUMERALS AND SIGNS

1: Magnetic recording and reproducing apparatus
2: Cartridge case 2
2A: Upper half of Cartridge case
2B: Lower half of Cartridge case
10: Magnetic tape cartridge
11: Cartridge reel (delivering reel)
20: Magnetic tape drive
21: Drive reel (winding-up reel)
21a: Flange
21b: Ditch
22: Core
23: Concavity
24: Spindle
25: Spindle drive unit
26: Winding reel drive unit
27: Controlling unit
30: Leader pin
31: Leader block
32: Drawing guide
40a: End face
41: Core
H: Magnetic head
LT: Leader tape
MT: Magnetic tape

DETAILED DESCRIPTION OF THE INVENTION

At least one surface of the leader tape according to the invention has center line average surface roughness (Ra) of from 10 to 60 nm.

This Ra is measured with a light interference surface roughness meter (HD-2000, manufactured by WYKO) under the following conditions.

Ra is computed after cylindrical compensation and gradient compensation with an objective lens of 50 magnifications, an intermediate lens of 0.5 magnifications, and measuring range of 242 µm×184 µm.

It is preferred that the leader tape in the invention is used for a magnetic recording/reproducing apparatus of linear recording density of 100 kfci or higher and the difference between a recording track width and a reproducing track width of from 0 to 16 µm. That is, in the system in which the difference between a recording track width and a reproducing track width exceeds 16 µm, since the recording track width is sufficiently broad as compared with the reproducing track width, even when the deviation of track of several µm or so occurs due to the deformation of tape, the head runs on the recording track, and so this does not result in the increase of dropout. However, in a magnetic recording and reproducing apparatus of a great linear recording density of the difference between a recording track width and a reproducing track width of 16 µm or less, the deviation of track is actualized, and a problem of imprinting of tape easily occurs. Accordingly, the effect of the leader tape of the invention becomes conspicuous when a magnetic recording and reproducing apparatus having great linear recording density is used.

Magnetic recording and reproducing apparatus are not particularly restricted so long as they consist of a magnetic tape cartridge and a magnetic tape drive.

The magnetic tape cartridge is not particularly limited so long as it comprises a cartridge case rotatably housing one or a plurality of reels on which a magnetic tape joined with the leader tape according to the invention is wound, but the effect of the invention is conspicuous in the case where the magnetic tape cartridge comprises a single reel.

The leader tape in the invention can be joined with a magnetic tape on which signals are to be recorded and reproduced in the state that one end of the leader tape is brought to be opposite to the tip of the magnetic tape and joined by means of a well-known splicing tape. The other end of the leader tape is equipped with a hitching element, e.g., a leader pin, and the hitching element is used for the fixation of the leader tape on the drive reel of a magnetic recording/reproducing apparatus.

For magnetic recording and reproduction, it will do to use a magnetic cartridge equipped with the leader tape of the invention in a magnetic recording and reproducing apparatus. Recording and reproduction is possible when a magnetic tape joined with the leader tape has linear recording density of 100 kfci or more (preferably 120 kfci or more, more preferably 140 kfci or more), and the difference between a recording track width (preferably 28 µm or less, more preferably 25 µm or less) and a reproducing track width (preferably 14 µm or less, more preferably 12 µm or less) of from 0 to 16 µm (preferably from 5 to 15 µm, more preferably from 5 to 10 µm).

When the leader tape and the magnetic tape cartridge in the invention are used in magnetic recording and reproduction, track deviation can be restrained and stable recording and reproduction can be ensured even with such a narrow recording track width and a small difference between a recording track width and a reproducing track width.

Recording and reproducing apparatus used for recording and reproduction with the above track widths are not especially restricted, and well-known magnetic recording and reproducing apparatus having recording and reproducing heads can be used.

As the magnetic heads for use in the invention, an inductive head is preferred for recording and an MR head is preferred for reproduction.

The present invention is described in detail below.

Leader Tape:

A coating layer provided on a support mainly comprises inorganic fine powder dispersed in a binder. The inorganic fine powder may be nonmagnetic or magnetic powder. The coating layer consists of one or two or more layers. The coating layer is provided at least on one side that is brought into contact with a magnetic head and the opposite side of a support.

The coating layer is provided for the purpose of giving functions that the support does not have, according to necessity, for example, adding an abrasive to the coating layer in contact with a magnetic head to give a cleaning effect, adding electrically conductive particles to give an antistatic function, and adding magnetic powder to record magnetic signals are exemplified.

It is possible for the coating layer to control a friction coefficient by containing a lubricant. As preferred coating layers, a magnetic layer similar to a data tape or a nonmagnetic layer is singly provided on the side of a support in contact with a magnetic head, or layers of two-layer structure comprising a magnetic layer (an upper layer) coated on a nonmagnetic layer (a lower layer) are provided on the side in contact with a magnetic head, and a back coat layer (a back layer) mainly comprising a carbon black is provided on the opposite side.

The total thickness of a leader tape is preferably from 5 to 20 μm, more preferably from 8 to 18 μm.

The thickness of a coating layer comprising a single layer or the total of plural layers is preferably from 0.1 to 5.0 μm, more preferably from 0.5 to 3.0 μm. The thickness of a support is preferably from 3 to 17 μm, more preferably from 6 to 15 μm.

The center line average surface roughness (Ra) of at least one surface of a leader tape is from 10 to 60 nm, preferably from 15 to 45 nm, by which a cushioning effect is obtained when the tape is wound on a reel, so that imprinting can be prevented. The surface roughness (Ra) of the obverse and reverse of a leader tape may be the same or different. Surface roughness can be controlled by various methods. For example, the surface roughness of a support, the thickness of a coating layer, the particle size of the inorganic powder used in a coating layer, and the conditions of calendering treatment are exemplified. When surface roughness of a leader tape is controlled by the roughness of a support, the roughness of a support is from 5 to 80 nm, preferably from 10 to 65 nm. The average particle size of the inorganic powder used in a coating layer is from 0.02 to 1 μm, preferably from 0.05 to 0.6 μm. As the shapes of the inorganic powder, granular, acicular, tabular and die-like shapes can be used.

In the invention, it is necessary that depression hardness (DH) be from 60 to 140 kg/mm² (0.588 to 1.372 GPa). When depression hardness (DH) deviates from the above range, the effect of the invention cannot be obtained. Preferred depression hardness (DH) is from 80 to 120 kg/mm² (0.784 to 1.176 GPa). The amount of plastic deformation of at least one surface of the leader tape of the invention is preferably from 0.02 to 0.050 μm.

Depression hardness (DH) and the amount of plastic deformation are described below.

Figure 5:
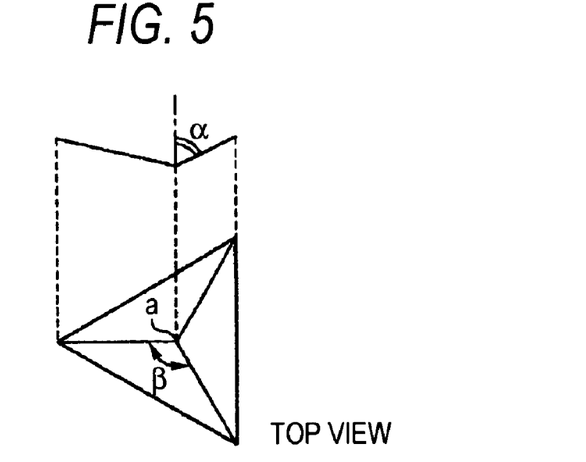
FIG. 5 is a view showing the shape of the indenter used in the invention.

As shown in FIG. 5, depression hardness (DH) in the invention is the hardness measured by a diamond indenter having a triangular pyramid shape, a radius of curvature of point a of 100 nm, an edge angle (α) of 65°, and an angle between edges (β) of 115°, with a load of 5 mgf. When an indenter having the above specific shape is depressed against a coating layer with a load of 5 mgf, point a of the indenter does not reach the depth of 0.1 μm from the surface of the coating layer, and the strength characteristics at the extreme surface of the coating layer that cannot be conventionally measured can be measured. The indenter having the above specific shape is known as Verkovich indenter. As a hardness-measuring instrument equipped with Verkovich indenter and capable of measurement with a load of 5 mgf, a super micro depression hardness tester (model number: ENT-1100a, manufactured by Elionix Co., Ltd.) can be used.

Figure 6:
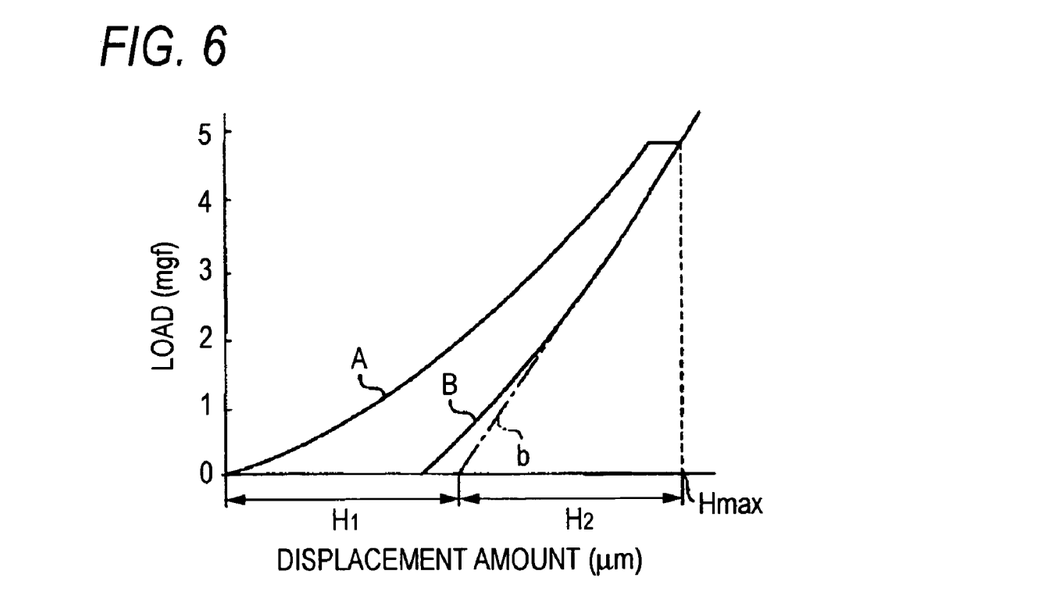
FIG. 6 is a view explaining the definition of depression hardness (DH).

FIG. 6 is a drawing showing the variation of the displacement amount of Verkovich indenter when Verkovich indenter is depressed against a sample with continuously increasing a load and the load is got rid of when the load reaches 5 mgf. As shown by curve A in the figure, the displacement amount increases as the load increases, and the displace amount shows the maximum displacement amount (Hmax) by the load of 5 mgf, and when the load is got rid of, as shown by curve B, the displacement amount gradually decreases, but the displacement amount shows a certain value even when the load reaches zero. At this time, by extrapolating tangential line b at the maximum displacement amount (Hmax) of curve B to load zero (i.e., abscissa), the amount of plastic deformation ($H_1$) can be obtained. The value obtained by subtracting the amount of plastic deformation ($H_1$) from the maximum displacement amount is the amount of elastic deformation ($H_2$).

Depression hardness (DH) is computed from the above maximum displacement amount (Hmax) and maximum load (Pmax=5 mgf) according the following equation (1):

$$DH=3.7926\times10^{-2}[Pmax/(Hmax)^2](kg/mm^2) \qquad (1)$$

The means for attaining the above ranges of depression hardness (DH) and plastic deformation ($H_1$) are not restricted but it is effective to adjust the amount of a hardening agent to be added to a coating layer, the selection of resin composition, the constitution of rolls, heating temperature, carrying speed and pressure in calendering treatment, in addition, the temperature, humidity and heating time in thermal treatment after calendering treatment.

The surface electrical resistance of a leader tape is preferably $10^{10}$ Ω/sq or less, more preferably $10^9$ Ω/sq or less. By this surface electrical resistance, the leader tape is prevented from electrification and the magnetic head is protected from damage by static electricity to thereby increase reliability and, at the same time, the durability against the repeating operation of loading/unloading on a magnetic recording and reproducing apparatus of a magnetic tape cartridge obtained by of the splicing of a leader tape that is fundamentally stronger than a magnetic tape is improved.

As the means to control the surface electrical resistance to a prescribed value, the addition of electrically conductive powders, e.g., a carbon black, to at least one layer of an upper layer, a lower layer and a back layer is exemplified. For example, the addition of a carbon black in an amount of from 1 to 20 weight parts per 100 weight parts of the binder in each layer is exemplified.

As the leader tape, a magnetic tape comprising a lower nonmagnetic layer containing inorganic powder and a binder, an upper magnetic layer containing ferromagnetic powder and a binder, and a back layer formed on the opposite side to the upper and lower layers is preferred.

A leader tape comprising the above magnetic tape is described in detail below.

Magnetic Layer:

Binders and the like of Magnetic Layer and Nonmagnetic Layer:

As the binders for use in a magnetic layer and a nonmagnetic layer, conventionally well known thermoplastic resins, thermosetting resins, reactive resins and mixtures of these resins are used. As the thermoplastic resins, those having a glass transition temperature of from −100 to 150° C., a number average molecular weight of from 1,000 to 200,000, preferably from 10,000 to 100,000, and the degree of polymerization of about 50 to 1,000 or so are used.

The examples of these binders include polymers or copolymers containing vinyl chloride, vinyl acetate, vinyl alcohol, maleic acid, acrylic acid, acrylic ester, vinylidene chloride, acrylonitrile, methacrylic acid, methacrylic ester, styrene, butadiene, ethylene, vinyl butyral, vinyl acetal or vinyl ether as the constitutional unit, polyurethane resins and various kinds of rubber resins. The examples of thermosetting resins and reactive resins include phenolic resins, epoxy resins, curable type polyurethane resins, urea resins, melamine resins, alkyd resins, acrylic reactive resins, formaldehyde resins, silicone resins, epoxy-polyamide resins, mixtures of polyester resins and isocyanate prepolymers, mixtures of polyester polyol and polyisocyanate, and mixtures of polyurethane and polyisocyanate. These resins are described in detail in *Plastic Handbook*, Asakura Shoten. Further, it is also possible to use well-known electron beam-curable resins in each layer. The examples of these resins and manufacturing methods thereof are disclosed in detail in JP-A-62-256219.

These resins can be used alone or in combination, and it is preferred in the invention to use combinations of at least one resin selected from vinyl chloride resins, vinyl chloride-vinyl acetate copolymers, vinyl chloride-vinyl acetate-vinyl alcohol copolymers, and vinyl chloride-vinyl acetate-maleic anhydride copolymers with a polyurethane resin and polyisocyanate.

Polyurethane resins having well known structures, e.g., polyester polyurethane, polyether polyurethane, polyether polyester polyurethane, polycarbonate polyurethane, polyester polycarbonate polyurethane and polycaprolactone polyurethane can be used. For the purpose of obtaining further excellent dispersibility and durability with respect to all the binders described above, it is preferred to use at least one polar group selected from the following and introduced by copolymerization or addition reaction according to necessity, e.g., COOM, $SO_3M$, $OSO_3M$, $P=O(OM)_2$, $O-P=O(OM)_2$ (wherein M represents a hydrogen atom or an alkali metal salt group), OH, $N(R)_2$, $N^+(R)_3$ (wherein R represents a hydrocarbon group), an epoxy group, SH and CN. The content of these polar groups is from $10^{-1}$ to $10^{-8}$ mol/g, preferably from $10^{-2}$ to $10^{-6}$ mol/g.

The content of hydroxyl groups in polyurethane resins is preferably from 3 to 20 groups per a molecule, and more preferably from 4 to 5 groups per a molecule. When the content is less than 3 groups per a molecule, the reactivity with a polyisocyanate hardening agent lowers, so that the film strength and durability are liable to decrease. While when the content is more than 20 groups, the solubility in a solvent and dispersibility are liable to deteriorate. For adjusting the hydroxyl group content in a polyurethane resin, compounds having trifunctional or higher hydroxyl groups can be used in the synthesis of the polyurethane resin. The specific examples of the compounds having trifunctional or higher hydroxyl groups include trimethylylethane, trimethylol-propane, trimellitic anhydride, glycerol, pentaerythritol, hexanetriol, and branched polyester and polyether ester having trifunctional or higher hydroxyl groups obtained from dibasic acid with polyester polyol as the starting the material and with the compound as the glycol component, as disclosed in JP-B-6-64726 (the term "JP-B" as used herein refers to an "examined Japanese patent publication"). Preferred hydroxyl groups are trifunctional groups, and tetrafunctional or higher groups are liable to cause gelation during reaction.

The examples of polyisocyanates that can be used in the invention include isocyanates, e.g., tolylene diisocyanate, 4,4'-diphenylmethane diisocyanate (MDI), hexamethylene diisocyanate, xylylene diisocyanate, naphthylene-1,5-diisocyanate, o-toluidine diisocyanate, isophorone diisocyanate and triphenylmethane triisocyanate; products of these isocyanates with polyalcohols; and polyisocyanates formed by condensation reaction of isocyanates.

The amount of binders for use in a magnetic layer and a nonmagnetic layer is from 5 to 50 weight %, preferably from 10 to 30 weight %, respectively based on the ferromagnetic powder and the nonmagnetic inorganic powder. When vinyl chloride resins are used, the amount thereof is from 5 to 30 weight %, when polyurethane resins are used, the amount thereof is from 2 to 20 weight %, and polyisocyanate is used in an amount of from 2 to 20 weight % in combination with these binders, however, for instance, when the corrosion of heads is caused by a slight amount of chlorine due to dechlorination, it is possible to use a combination of polyurethane and isocyanate alone.

In such a magnetic tape, the amount of a binder, the amounts of vinyl chloride resin, polyurethane resin, polyisocyanate or other resins contained in the binder, the molecular weight of each resin constituting a magnetic layer, the amount of polar groups, or the physical characteristics of the above-described resins can of course be varied in a magnetic layer and a nonmagnetic layer according to necessity. These factors should be rather optimized in each layer. Well-known techniques with respect to multilayer magnetic layer can be used in the invention. For example, when the amount of a binder is varied in each layer, it is effective to increase the amount of the binder contained in a magnetic layer to thereby reduce scratches on the magnetic layer surface. For improving the head touch against a head, it is effective to increase the amount of the binder in a nonmagnetic layer to impart flexibility.

Ferromagnetic Powder:

Ferromagnetic alloy powders comprising α-Fe as the main component are preferred as the ferromagnetic powders for use in a magnetic layer. These ferromagnetic powders may contain atoms, in addition to the prescribed atoms, e.g., Al, Si, S, Sc, Ca, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr and B. In particular, it is preferred to contain at least one of Al, Si, Ca, Y, Ba, La, Nd, Co, Ni and B in addition to α-Fe, and it is more preferred to contain at least one of Co, Y and Al.

A small amount of hydroxide or oxide may be contained in ferromagnetic alloy fine powders. Ferromagnetic alloy fine powders manufactured by well-known methods can be used, for example, the following methods are exemplified, e.g., a method of performing reduction with a composite organic acid salt (mainly oxalate) and reducing gas, e.g., hydrogen; a method of reducing an iron oxide with reducing gas, e.g., hydrogen, to thereby obtain Fe or Fe—Co particles; a method of heat-decomposing a metal carbonyl compound; a method of performing reduction by adding a reducing agent, e.g., sodium boron hydride, hypophosphite or hydrazine, to an aqueous solution of a ferromagnetic metal; and a method of evaporating a metal in low pressure inert gas to obtain fine powder. The thus-obtained ferromagnetic alloy powders are subjected to well known gradual oxidation treatment, and any of the following methods can be used in the invention, e.g., a method of immersing the powders in an organic solvent and then drying; a method of immersing the powders in an organic solvent, charging an oxygen-containing gas to form oxide films on the surfaces thereof, and then drying; and a method of forming oxide films on the surfaces of the powders by regulating partial pressure of an oxygen gas and an inert gas without using an organic solvent.

As the ferromagnetic powders for use in a magnetic layer, hexagonal ferrite powders can also be used. As the hexagonal ferrite powders, e.g., barium ferrite, strontium ferrite, lead ferrite, calcium ferrite, and the substitution products of these ferrites, e.g., Co substitution products are exemplified. Specifically, magnetoplumbite type barium ferrite and strontium ferrite, magnetoplumbite type barium ferrite having covered the particle surfaces with spinel, magnetoplumbite type barium ferrite and strontium ferrite partially containing a spinel phase are exemplified. The hexagonal ferrite powders may contain, in addition to the prescribed atoms, the following atoms, e.g., Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge and Nb. In general, hexagonal ferrite powders containing the following elements can be used, e.g., Co—Ti, Co—Ti—Zr, Co—Ti—Zn, Ni—Ti—Zn, Nb—Zn—Co, Sb—Zn—Co and Nb—Zn.

Nonmagnetic Layer:

Inorganic powders for use in a nonmagnetic layer are nonmagnetic powders and can be selected from inorganic compounds, e.g., metallic oxide, metallic carbonate, metallic sulfate, metallic nitride, metallic carbide and metallic sulfide. By the incorporation of carbon blacks into a nonmagnetic layer, a desired micro Vickers' hardness can be obtained in addition to the well-known effects of reducing surface electrical resistance (Rs) and light transmittance. Further, it is also possible to obtain the effect of stocking a lubricant by the incorporation of carbon blacks into a lower layer. Furnace blacks for rubbers, thermal blacks for rubbers, carbon blacks for coloring, acetylene blacks, etc., can be used as carbon blacks. Carbon blacks used in a lower layer should optimize the characteristics as follows by the desired effects and sometimes more effects can be obtained by the combined use. If necessary, organic powders may be added to a nonmagnetic layer. With respect to lubricants, dispersants, additives, solvents, dispersing methods and others in a nonmagnetic layer, well-known techniques in magnetic layers can be used.

Additives:

As the additives for a magnetic layer and a nonmagnetic layer, additives having a head-polishing effect, a lubricating effect, an antistatic effect, a dispersing effect, and a plasticizing effect are used. Specifically, those disclosed in WO 98/35345 are exemplified.

As lubricants, for example, monobasic fatty acids having from 10 to 24 carbon atoms, metal salts thereof (e.g., with Li, Na, K or Cu), fatty acid monoester, fatty acid diester or fatty acid triester composed of a monobasic fatty acid having from 10 to 24 carbon atoms and any one of mono-, di-, tri-, tetra-, penta- and hexa-alcohols having from 2 to 12 carbon atoms, fatty acid ester of monoalkyl ether of alkylene oxide polymerized product, and fatty acid amide having from 8 to 22 carbon atoms can be used. These fatty acids and alcohols may contain an unsaturated bond or may be branched.

The specific examples of fatty acids include capric acid, caprylic acid, lauric acid, myristic acid, palmitic acid, stearic acid, behenic acid, oleic acid, elaidic acid, linoleic acid, linolenic acid and isostearic acid. The examples of esters include butyl stearate, octyl stearate, amyl stearate, isooctyl stearate, butyl myristate, octyl myristate, butoxyethyl stearate, butoxydiethyl stearate, 2-ethylhexyl stearate, 2-octyldodecyl palpitate, 2-hexyldodecyl palmitate, isohexadecyl stearate, oleyl oleate, dodecyl stearate, tridecyl stearate, oleyl erucate, neopentyl glycol didecanoate, and ethylene glycol dioleyl.

Back Layer:

It is preferred that a carbon black and inorganic powder are contained in a back layer. The prescriptions of binders and various additives used in the magnetic layer and the nonmagnetic layer are applied to a back layer. The thickness of a back layer is preferably from 0.1 to 1.0 µm, more preferably from 0.4 to 0.6 µm.

Support:

A support for use in a magnetic tape is preferably a nonmagnetic and flexible support, and well-known films, such as polyesters (e.g., polyethylene terephthalate and polyethylene naphthalate), polyolefins, cellulose triacetate, polycarbonate, aromatic or aliphatic polyamide, polyimide, polyamideimide, polysulfone, polyaramid, and benzoxazole can be used. A polyethylene terephthalate film and a polyimide film are preferably used. These supports may be previously subjected to corona discharge treatment, plasma treatment, adhesion assisting treatment, heat treatment, or dust removing treatment.

These supports have an elastic modulus in the machine direction of from 3.5 to 20 GPa, an elastic modulus in the transverse direction of from 3.5 to 20 GPa, preferably an elastic modulus both in the machine direction and the transverse direction of from 4 to 15 GPa.

Manufacturing Method:

A magnetic layer and a nonmagnetic layer can be formed by preparing each coating solution by dissolving or dispersing the above components in a solvent and coating the coating solutions in sequence on a support (a web). Coating may be performed by any of a wet-on-wet method of coating a magnetic layer while a nonmagnetic layer is still wet, or a wet-on-dry method of coating a magnetic layer after a nonmagnetic layer is dried. A coated and dried web is arbitrarily subjected to orientation treatment, calendering treatment, and slitting.

Magnetic Tape for Data Recording:

As a magnetic tape for data recording, a tape comprising a nonmagnetic support having provided thereon a magnetic layer and, if necessary, a back coat layer is used. A preferred magnetic tape for data recording comprises a support having a thickness of from 2 to 9 µm having provided thereon a magnetic layer and a nonmagnetic layer, and a back coat layer on the opposite side. The constituents for a magnetic tape are those suitable for high density recording and the magnetic tapes disclosed in JP-A-2001-250219 and JP-A-2002-251710 are exemplified as preferred examples.

Further, in the invention, the thickness of a magnetic tape is from 3 to 11 µm, preferably from 4 to 9 µm, and when cupping is from 0.3 to 2 mm per ½ inch width, preferably from 0.3 to 1.5 mm, a magnetic tape cartridge further suitable for high density recording can be obtained.

Magnetic Tape Cartridge:

The magnetic tape cartridge according to the invention comprises a cartridge case rotatably housing one or a plurality of reels on which a magnetic tape is wound, and as the leader tape joined at the tip of the magnetic tape for leading the magnetic tape to be loaded into a magnetic recording and reproducing apparatus, the leader tape in the invention is used.

Magnetic Recording and Reproducing Apparatus:

When the leader tape in the invention is used in a magnetic recording and reproducing apparatus having linear recording density of 100 kfci or higher and the difference between a recording track width and a reproducing track width of 16 µm or less, a particularly conspicuous effect can be exhibited, and in a magnetic recording and reproducing apparatus having the difference between a recording track width and a reproducing track width of 10 μm or less, a further conspicuous effect can be obtained.

The thickness of the leader tape is 5 times the thickness of a magnetic tape or less, preferably 3 times or less, and more preferably 2 times or less.

The length of the leader tape is preferably longer than the length of at least three rounds of the drive reel in a magnetic recording and reproducing apparatus plus the length of the traveling route from the opening of the cartridge case to the drive reel.

Figure 1:
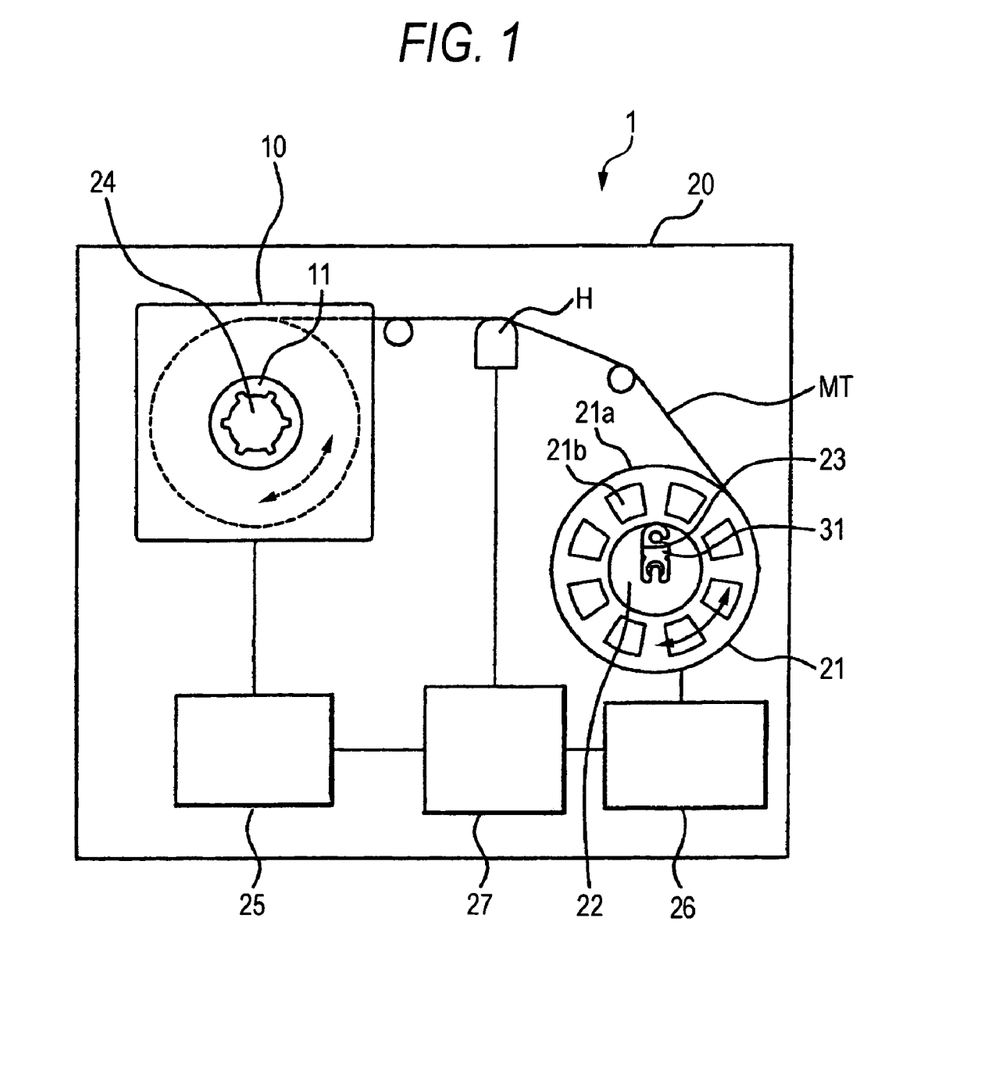
FIG. 1 is a block diagram conceptually showing a magnetic recording and reproducing apparatus in one mode for carrying out the invention.
Figure 2:
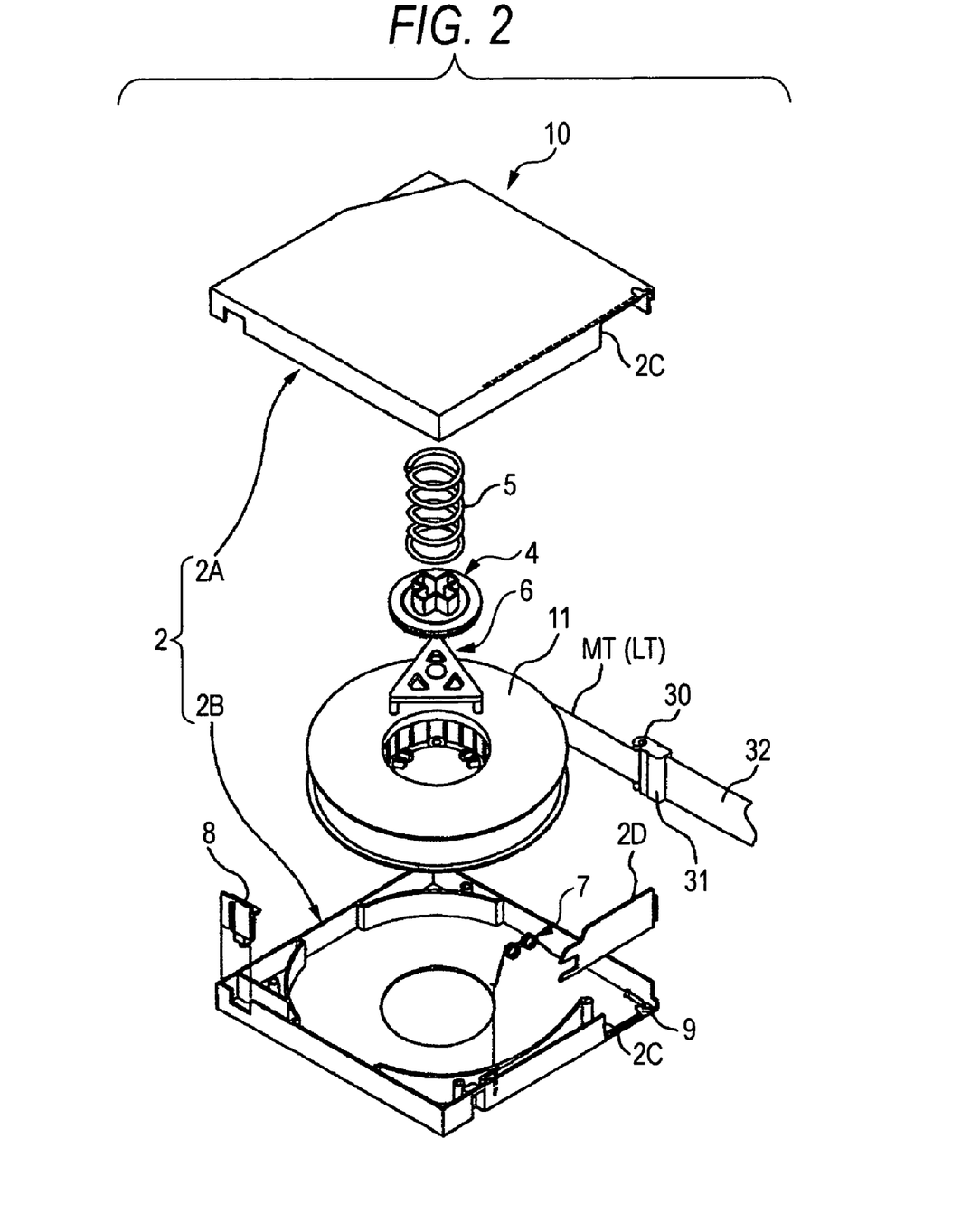
FIG. 2 is a disassembled diagonal view showing a magnetic tape cartridge similarly used in the magnetic recording and reproducing apparatus.
Figure 3A:
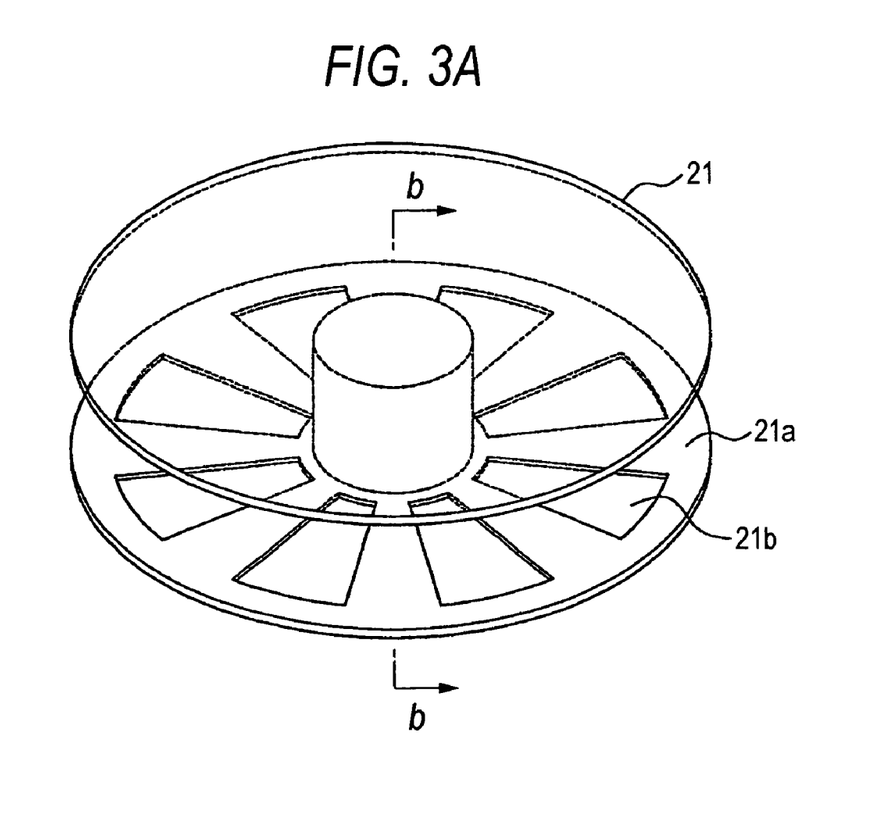
FIG. 3A is a diagonal view showing a drive reel similarly used in the magnetic recording and reproducing apparatus.
Figure 3B:
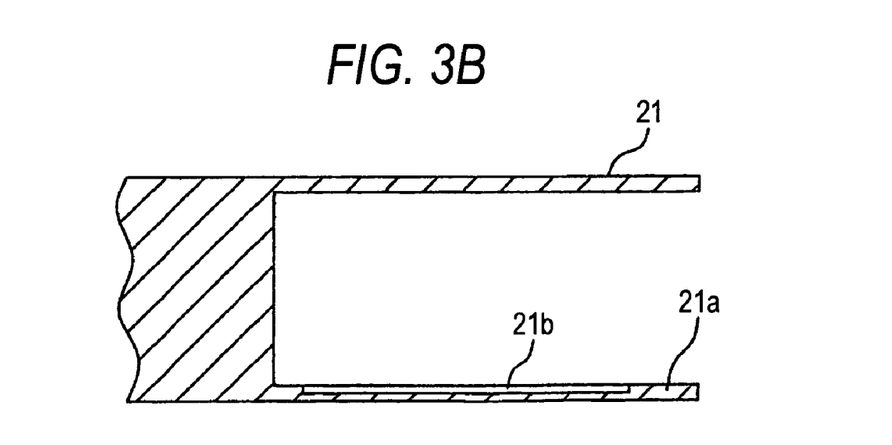
FIG. 3B is an enlarged cross sectional view of line b-b part in FIG. 3A.

The details of a magnetic recording and reproducing apparatus concerning the embodiments in the invention are described with referring to the accompanying drawings. In the reference drawings, FIG. 1 is a block diagram conceptually showing a magnetic recording and reproducing apparatus in one mode for carrying out the invention, FIG. 2 is a disassembled diagonal view showing a magnetic tape cartridge similarly used in the magnetic recording and reproducing apparatus, FIG. 3A is a diagonal view showing a drive reel (a winding-up reel) similarly used in the magnetic recording and reproducing apparatus, and FIG. 3B is an enlarged cross sectional view of line b-b part in FIG. 3A. In this mode of the invention, a magnetic recording and reproducing apparatus consisting of a magnetic tape cartridge comprising one cartridge reel (a delivering reel) on which a tape-like recording medium is wound and a magnetic tape drive (a tape drive) loading the magnetic tape cartridge is described.

As shown in FIG. 1, magnetic recording and reproducing apparatus 1 consists of magnetic tape cartridge 10 and magnetic tape drive 20. In magnetic recording and reproducing apparatus 1 of such a constitution, data are recorded on magnetic tape MT or data recorded on magnetic tape MT are reproduced while winding magnetic tape MT as the tape-like recording medium wound on magnetic tape cartridge 10 round on drive reel 21 of magnetic tape drive 20 of the receiving side, or rewinding magnetic tape MT wound on drive reel 21 round cartridge reel (delivering reel) 11.

As shown in FIG. 2, magnetic tape cartridge 10 is in conformity to LTO standard and has cartridge case 2 consisting of the structure divided to lower half 2B and upper half 2A. The inside of cartridge case 2 consists of a single cartridge reel 11 wound with magnetic tape MT in advance, reel lock 4 and compression coil spring 5 for maintaining the revolution of cartridge reel 11 in a locked state, release pad 6 for releasing the locked state of cartridge reel 11, sliding door 2D for opening and closing outlet 2C of magnetic tape formed on the side of cartridge case 2 across lower half 2B and upper half 2A, torsion coil spring 7 to energize sliding door 2D to the closing position of outlet 2C of magnetic tape, erroneous erasure preventing claw 8, and leader pin container 9 formed in the vicinity of outlet 2C of magnetic tape. Leader tape LT is joined onto the tip of magnetic tape MT. Magnetic tape MT shown in FIG. 2 is leader tape LT.

Magnetic tape cartridge 10 is, as shown in FIG. 1, loaded on magnetic tape drive 20, and leader tape LT is drawn by leader block 31 described later. Leader block 31 is invaginated into concavity 23 installed at core 22 of drive reel 21 of magnetic tape drive 20, by which it becomes possible for leader tape LT of magnetic tape cartridge 10 to be wound round core 22 of drive reel 21.

Leader tape LT and magnetic tape MT for use in magnetic tape cartridge 10 in the embodiment of the invention are described in detail below.

Leader tape LT is formed as a long size tape and has a length of capable of winding at least three rounds around core 22 of drive reel 21 of magnetic tape drive 20. Leader tape LT preferably has a length of from 0.5 to 5.0 m, more preferably 0.9 m.

In the next place, magnetic tape drive 20 is described.

As shown in FIG. 1, magnetic tape drive 20 is equipped with spindle 24, spindle drive unit 25 for driving spindle 24, magnetic head H, drive reel 21, winding reel drive unit 26 for driving drive reel 21, and controlling unit 27.

Magnetic tape drive 20 has leader block 31 capable of hitching on leader pin 30 installed at the tip of leader tape LT of magnetic tape cartridge 10 (see FIG. 2), and leader block 31 is carried to the side of magnetic tape cartridge 10 by means of the drawing mechanism including drawing guide 32 not shown in the figure.

When recording and reproducing of data are performed with magnetic tape MT, magnetic tape MT is carried by rotary driving of spindle 24 and drive reel 21 by spindle drive unit 25 and winding reel drive unit 26.

As shown in FIGS. 3A and 3B, in drive reel 21, radial ditch 21b are formed at regular intervals on the upper surface of lower flange 21a. Ditch 21b are to function as discharge channels for discharging the air accompanied when magnetic tape MT is wound up on drive reel 21.

The action of magnetic tape drive 20 is described below.

When magnetic tape cartridge 10 is loaded on magnetic tape drive 20 as shown in FIG. 1, drawing guide 32 (see FIG. 2) draws leader pin 30, transfers leader pin 30 to drive reel 21 via magnetic head H, and invaginates leader block 31 in concavity 23 of core 22 of drive reel 21. Concavity 23 is equipped with a hitching component not shown for preventing leader block 31 from jumping out of concavity 23.

Spindle drive unit 25 and winding reel drive unit 26 are driven by the control of controlling unit 27, and spindle 24 and drive reel 21 are revolved in the same direction so that leader tape LT and magnetic tape MT are transferred to drive reel 21 from cartridge reel 11. By this operation, leader tape LT is wound on drive reel 21, and then recording of data on magnetic tape MT by magnetic head H and reproduction of data recorded on magnetic tape MT are performed while winding magnetic tape MT on drive reel 21.

In the case of rewinding magnetic tape MT on cartridge reel 11, magnetic tape MT is transferred to cartridge reel 11 by revolution driving spindle 24 and drive reel 21 in the opposite direction to the above. In the case of rewinding, recording of data on magnetic tape MT by magnetic head H and reproduction of data recorded on magnetic tape MT are also performed.

In magnetic recording and reproducing apparatus 1, magnetic tape MT is generally put on the state being wound on the side of magnetic tape cartridge 10, but according to a mode of use, there is a case where magnetic tape MT is stored for a long period of time in the state of being wound on drive reel 21 of the side of magnetic tape drive 20, and the utility of preventing imprinting is particularly high in such a mode of use, so that magnetic recording and reproducing apparatus 1 of this embodiment is suitable. That is, in winding magnetic tape MT on drive reel 21 of magnetic tape drive 20 from magnetic tape cartridge 10, leader block 31 for drawing magnetic tape MT from magnetic tape cartridge 10 is to be invaginated into core 22 of drive reel 21, but it is apprehended that leader block 31 might protrude from the end face of core 22 (difference in levels) according to the dimensional accuracy of leader block 31. In such a case, if a conventional leader tape is wound round drive reel 21, the difference in levels is imprinted on magnetic tape MT, so that there arise the possibilities of recording of magnetic tape MT being incapable and the data being lost.

In contrast with this, in the magnetic recording and reproducing method in the invention, difference in levels can be well absorbed by leader tape LT, and excellent advantages such that recording incapability in magnetic tape MT and data lost can be prevented from occurring can be obtained even when magnetic recording and reproducing apparatus 1 having linear recording density of 100 kfci or more and the difference between a recording track width and a reproducing track width of from 0 to 16 µm is used.

EXAMPLES

The invention will be described more specifically with referring to examples, but it should not be construed that the invention is limited to these examples.

Example 1

In the examples "parts" means "weight parts" unless otherwise indicated.

Manufacture of Leader Tape

<Preparation of Coating Solution>

| Composition of upper layer coating solution: | |
|---|---|
| Ferromagnetic metal powder | 100 parts |
| Coercive force (Hc): 191 kA/m (2,400 Oe) | |
| Specific surface area ($S_{BET}$): 62 m²/g | |
| Crystallite size: 110 A | |
| Saturation magnetization ($\sigma_s$): 117 A · m²/kg | |
| Average long axis length: 45 nm | |
| Average acicular ratio: 5 | |
| pH: 9.3 | |
| Co/Fe: 25 atomic % | |
| Al/Fe: 7 atomic % | |
| Y/Fe: 12 atomic % | |
| Vinyl chloride copolymer | 5 parts |
| MR-110 (manufactured by Nippon Zeon Co., Ltd.) | |
| —SO₃Na group content: 5 × 10⁻⁶ eq/g | |
| Degree of polymerization: 350 | |
| Polyester polyurethane resin | 12 parts |
| Neopentyl glycol/caprolactone polyol/MDI = 0.9/2.6/1 (by weight) | |
| —SO₃Na group content: 1 × 10⁻⁴ eq/g | |
| α-Al₂O₃ | 10 parts |
| Average particle size: 0.3 µm | |
| Carbon black | 1 part |
| Average particle size: 0.10 µm | |
| Butyl stearate | 1.5 parts |
| Stearic acid | 0.5 parts |
| Methyl ethyl ketone | 150 parts |
| Cylcohexanone | 50 parts |
| Toluene | 40 parts |
| Composition of lower layer coating solution: | |
| Nonmagnetic powder, acicular α-iron oxide | 80 parts |
| Specific surface area ($S_{BET}$): 58 m²/g | |
| Average long axis length: 0.15 µm | |
| Acicular ratio: 7.5 | |
| Carbon black | 20 parts |
| Average primary particle size: 16 nm | |
| DBP oil absorption amount: 80 ml/100 g | |
| pH: 8.0 | |
| Specific surface area ($S_{BET}$): 250 m²/g | |
| Vinyl chloride copolymer | 12 parts |
| MR-110 (manufactured by Nippon Zeon Co., Ltd.) | |
| Polyester polyurethane resin | 5 parts |
| Neopentyl glycol/caprolactone polyol/MDI = 0.9/2.6/1 (by weight) | |
| —SO₃Na group content: 1 × 10⁻⁴ eq/g | |
| Butyl stearate | 1.06 parts |
| Stearic acid | 1.18 parts |
| Methyl ethyl ketone | 150 parts |

-continued

| | |
|---|---|
| Cyclohexanone | 50 parts |
| Toluene | 40 parts |

With each of the compositions for forming an upper layer and a lower layer coating solutions, the components were kneaded in a continuous kneader and then dispersed in a sand mill. Polyisocyanate (Coronate L, manufactured by Nippon Polyurethane Co., Ltd.) was added in an amount of 5 parts to respective dispersions. Further, 40 parts of methyl ethyl ketone was added to the dispersions, and each of the dispersions was filtered through a filter having a pore diameter of 1 µm to prepare coating solutions for forming an upper layer and a lower layer.

| Composition of back layer coating solution: | |
|---|---|
| Fine particle carbon black | 100 parts |
| BP-800 (manufactured by Cabot Co., Ltd.) | |
| Average particle size: 17 nm | |
| Coarse particle carbon black powder | 10 parts |
| Thermal Black (manufactured by Cancarb Co., Ltd.) | |
| Average particle size: 270 nm | |
| α-Alumina (hard inorganic powder) | 5 parts |
| Average particle size: 200 nm | |
| Mohs' hardness: 9 | |
| Nitrocellulose resin | 140 parts |
| Polyurethane resin | 15 parts |
| Polyester resin | 5 parts |
| Dispersants | |
| Copper oleate | 5 parts |
| Copper phthalocyanine | 5 parts |
| Barium sulfate (precipitating) | 5 parts |
| BF-1 (manufactured by Sakai Chemical Industry Co., Ltd.) | |
| Average particle size: 50 nm | |
| Mohs' hardness: 3 | |
| Methyl ethyl ketone | 1,200 parts |
| Butyl acetate | 300 parts |
| Toluene | 600 parts |

The composition for forming a back layer was kneaded in a continuous kneader and then dispersed in a sand mill. Polyisocyanate (Coronate L, manufactured by Nippon Polyurethane Co., Ltd.) in an amount of 40 parts and methyl ethyl ketone in an amount of 1,000 parts were added to the dispersion, and the dispersion was filtered through a filter having a pore diameter of 1 µm to prepare a coating solution for forming a back layer.

Manufacture of Leader Tape:

The obtained upper layer coating solution and lower layer coating solution were simultaneously coated by multilayer-coating on a long size polyethylene terephthalate (PET) support (a thickness: 14.5 µm, a Young's modulus in the machine direction (MD): 500 kg/mm² (4.9 GPa), a Young's modulus in the transverse direction (TD): 500 kg/mm² (4.9 GPa), center line average surface roughness Ra of the upper layer side: 35 nm, Ra of the back layer side: 36 nm) in the dry thickness of upper layer of 0.1 µm and that of lower layer of 1.4 µm. The coated upper layer solution was subjected to orientation while still wet with a cobalt magnet having a magnetic force of 300 mT and a solenoid having a magnetic force of 150 mT, and then drying to thereby form an upper layer.

A back layer-forming coating solution was coated after that on the other side of the support (the opposite side to the upper layer) in a dry thickness of 0.5 µm, and dried to form a back layer. Thus, a roll for a leader tape having the upper layer on one side of the support and the back layer on the other side was obtained.

The roll was further subjected to calendering treatment with a calendering processor (temperature: 90° C.), and then slit to ½ inch in width to form a leader tape.

The total thickness of the leader tape was 16.5 μm, Ra of the magnetic layer surface was 25 nm, Ra of the back layer surface was 30 nm, and depression hardness (DH) was 100 kg/mm² (0.98 GPa).

Magnetic Tape for Data Recording:

Data-recording magnetic tape was prepared by coating the same upper layer, lower layer and back layer coating solutions as used for the leader tape on a polyethylene naphthalate (PEN) support having Ra of the magnetic layer side of 3 nm and a thickness of 5.2 μm in a dry thickness of nonmagnetic lower layer of 1.0 μm and magnetic upper layer of 0.1 μm, and performing magnetic field orientation in the same manner as in the above leader tape.

Subsequently, a back coat layer was formed in a dry thickness of 0.5 μm. A magnetic tape for data recording having a width of ½ inches was obtained in the same manner as in the leader tape for data recording.

Manufacture of Magnetic Tape Cartridge:

A magnetic tape cartridge was manufactured by splicing the above-obtained ½ inch wide leader tape on the magnetic tape for data recording. The magnetic tape was wound by 580 m.

Example 2

A magnetic tape cartridge was manufactured in the same manner as in Example 1 except that the addition amount of the hardening agent (polyisocyanate) in the upper and lower layers in the preparation of the leader tape was changed from 5 parts to 8 parts.

Example 3

A magnetic tape cartridge was manufactured in the same manner as in Example 1 except that the addition amount of butyl stearate and stearic acid in the upper coating solution were changed from 1.5 parts to 2.5 parts, and 0.5 parts to 1 parts, respectively.

Example 4

A magnetic tape cartridge was manufactured in the same manner as in Example 1 except that the calendering treatment was made with a calendering processor (temperature: 95° C.).

Comparative Example 1

A magnetic tape cartridge was manufactured in the same manner as in Example 1 except that the addition amount of the hardening agent in the upper and lower layers in the preparation of the leader tape was changed from 5 parts to 1 part.

Comparative Example 2

A magnetic tape cartridge was manufactured in the same manner as in Example 1 except that a support having Ra of 70 nm was used in the preparation of the leader tape and calendering treatment was performed at 70° C.

Comparative Example 3

A magnetic tape cartridge was manufactured in the same manner as in Example 1 except that a support having Ra of 8 nm was used in the preparation of the leader tape.

Comparative Example 4

A magnetic tape cartridge was manufactured in the same manner as in Example 1 except that the addition amount of vinyl chloride copolymer in the upper layer was changed to 2 parts and that in the lower layer was changed to 6 parts in the preparation of the leader tape.

Comparative Example 5

A magnetic tape cartridge was manufactured in the same manner as in Example 1 except that the addition amount of α-$Al_2O_3$ was changed from 10 parts to 20 parts.

Evaluation of Magnetic Tape Cartridge:

Each of the obtained magnetic tape cartridges was evaluated according to the following conditions. The results obtained are shown in Table 1 below.

Imprinting Test:

Signals of linear recording density of 150 kfci were recorded on each magnetic tape with LTO modified drive by recording track width of 10 μm and reproduction track width of 4.5 μm, full length of the tape was wound on the drive reel under the tension of 0.8 N, and the magnetic tape cartridge was stored at 50° C. for 12 hours together with the drive. The error rate at the starting part of the tape was measured when the signals were reproduced after storage, and the length on which imprinting occurred (the distance from the joined part with the leader tape) was visually measured.

Leader Tape Scratching Test:

The occurrence of scratches on each magnetic tape cartridge was visually observed after 100 passes at a transfer rate of 6 m/sec by with the above LTO modified drive.

Point 3: Scratch did not occur.
Point 2: Scratches occurred a little.
Point 1: A great deal of scratches occurred.

TABLE 1

| Example No. | Surface Roughness (Ra) of Upper Layer of Leader Tape (nm) | Surface Roughness (Ra) of Back Layer of Leader Tape (nm) | DH of Upper Layer (kg/mm²) | Length of Imprinting (m) | Error Rate | Scratch Test |
|---|---|---|---|---|---|---|
| Example 1 | 25 | 30 | 100 | 1 | $2 \times 10^{-7}$ | 3 |
| Example 2 | 38 | 35 | 110 | 0.5 | $3 \times 10^{-7}$ | 3 |
| Example 3 | 25 | 30 | 60 | 0.5 | $2.5 \times 10^{-7}$ | 3 |
| Example 4 | 15 | 20 | 140 | 0.7 | $3.2 \times 10^{-7}$ | 3 |
| Comparative Example 1 | 33 | 33 | 50 | 0.9 | $4 \times 10^{-5}$ | 1 |

TABLE 1-continued

| Example No. | Surface Roughness (Ra) of Upper Layer of Leader Tape (nm) | Surface Roughness (Ra) of Back Layer of Leader Tape (nm) | DH of Upper Layer (kg/mm$^2$) | Length of Imprinting (m) | Error Rate | Scratch Test |
|---|---|---|---|---|---|---|
| Comparative Example 2 | 70 | 70 | 90 | 10 | $3.5 \times 10^{-5}$ | 2 |
| Comparative Example 3 | 8 | 8 | 90 | 20 | $2 \times 10^{-4}$ | 1 |
| Comparative Example 4 | 35 | 30 | 30 | 15 | $3 \times 10^{-5}$ | 1 |
| Comparative Example 5 | 40 | 35 | 160 | 1 | $2.3 \times 10^{-5}$ | 1 |

Examples of the invention showed good results in length of imprinting, error rate and scratch test, since any and all of Ra of the leader tape and DH of the upper layer were set pertinently. On the contrary, in Comparative Example 1, scratch test showed a bad result due to low DH. In Comparative Example 2, since Ra was as high as 70 nm, the cushioning effect was lost, which resulted in imprinting. In Comparative Example 3, since Ra was as low as 8 nm, the cushioning effect was lost and deteriorated in durability due to smoothness. In Comparative Example 4, scratch test showed a bad result due to low DH.

This application is based on Japanese Patent application JP 2004-94386, filed Mar. 29, 2004 and Japanese Patent application JP 2005-92579, filed Mar. 28, 2005, the entire contents of which are hereby incorporated by reference, the same as if set forth at length.

What is claimed is:

1. A magnetic tape cartridge comprising:
a reel;
a magnetic tape;
a leader tape joined at a tip of the magnetic tape to be loaded into a magnetic recording and reproducing apparatus;
a cartridge case rotatably housing the reel on which the magnetic tape is wound, wherein the leader tape comprises a support and a coating layer containing powder and a binder, wherein at least one surface of the leader tape has a center line average surface roughness (Ra) of from 10 to 60 nm, and depression hardness (DH) defined by the following equation (1) of from 60 to 140 kg/mm$^2$ (0.588 to 1.372 GPa):

$$DH = 3.7926 \times 10^{-2} [Pmax/(Hmax)^2] kg/mm^2 \qquad (1)$$

wherein Pmax is a maximum load and Hmax is a maximum displacement amount of an indenter.

2. The leader tape according to claim 1, wherein the depression hardness (DH) defined by the equation (1) is from 80 to 120 kg/mm$^2$ (0.784 to 1.176 GPa).

3. The leader tape according to claim 1, wherein at least one surface of the leader tape has a center line average surface roughness (Ra) of from 15 to 45 nm.

4. The leader tape according to claim 1, which comprises:
a back layer containing a carbon black;
the support;
a nonmagnetic layer containing inorganic powder and a binder; and
a magnetic layer containing ferromagnetic powder and a binder,
in this order.

5. The leader tape according to claim 4, which the magnetic layer contains the binder in an amount of from 5 to 50 weight % based on an amount of the ferromagnetic powder contained in the magnetic layer.

6. The leader tape according to claim 4, which the nonmagnetic layer contains the binder in an amount of from 5 to 50 weight % based on an amount of the inorganic powder contained in the nonmagnetic layer.

7. The leader tape according to claim 4, which the magnetic layer contains polyisocyanate in an amount of from 2 to 20 weight % based on an amount of the ferromagnetic powder contained in the magnetic layer.

8. The leader tape according to claim 4, which the nonmagnetic layer contains polyisocyanate in an amount of from 2 to 20 weight % based on an amount of the inorganic powder contained in the nonmagnetic layer.

9. The leader tape according to claim 4, which the support has a center line average surface roughness (Ra) of from 5 to 80 nm.

10. The leader tape according to claim 4, which the support has a center line average surface roughness (Ra) of from 10 to 65 nm.

11. The leader tape according to claim 4, which the inorganic powder has an average particle size of from 0.02 to 1 µM.

12. The leader tape according to claim 4, which the inorganic powder has an average particle size of from 0.05 to 0.6 µm.

* * * * *